(12) United States Patent
Jackson et al.

(10) Patent No.: US 6,296,201 B1
(45) Date of Patent: Oct. 2, 2001

(54) METHOD AND APPARATUS FOR REMOVING OPTICAL FIBER

(75) Inventors: Camille Joy Jackson, Hiram; Kazuyuki Uemura, Carrollton, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/493,374

(22) Filed: Jan. 28, 2000

(51) Int. Cl.[7] .............................. B65H 43/00; B65H 49/00
(52) U.S. Cl. ................... 242/563.2; 226/97.4; 242/564.3; 242/128
(58) Field of Search .............................. 242/563.2, 563, 242/564.3, 566, 920, 128; 226/97.4; 28/294

(56) References Cited

U.S. PATENT DOCUMENTS

| | | | |
|---|---|---|---|
| 1,988,255 | * | 1/1935 | Soons .............................. 250/559.14 |
| 2,563,986 | * | 8/1951 | Bauer .............................. 226/97.4 X |
| 3,154,836 | * | 11/1964 | Hoag, Jr. et al. .................. 242/563 X |
| 3,669,328 | * | 6/1972 | Castelli .............................. 226/97.4 |
| 3,782,617 | * | 1/1974 | Gasser et al. ........................ 226/97.4 |
| 4,114,790 | * | 9/1978 | Sighieri et al. .................. 226/97.4 X |
| 5,016,679 | * | 5/1991 | Cox .................................. 226/97.4 X |
| 5,019,780 | * | 5/1991 | Bailey .............................. 242/128 X |
| 5,046,674 | * | 9/1991 | Kolschbach et al. ........... 226/97.4 X |

FOREIGN PATENT DOCUMENTS 40 37 067 * 5/1992 (DE) .............................. 242/564.3 X

\* cited by examiner

Primary Examiner—Michael R. Mansen
(74) Attorney, Agent, or Firm—Thomas, Kayden, Horstemeyer & Risley, LLP

(57) ABSTRACT

A system for removing optical fiber from a spool, including a frame adapted to support the spool of optical fiber, and a head adapted to be placed in axial alignment with the spool supported by the frame. The head has an internal passage that extends therethrough which is adapted to receive a portion of the optical fiber to be removed from the spool. The head further has a supply passage that extends through the head to the internal passage. This supply passage is oriented within the head to channel pressurized gas through the supply passage and through the internal passage so as to draw the optical fiber through the head to unravel the optical fiber from the spool.

25 Claims, 4 Drawing Sheets

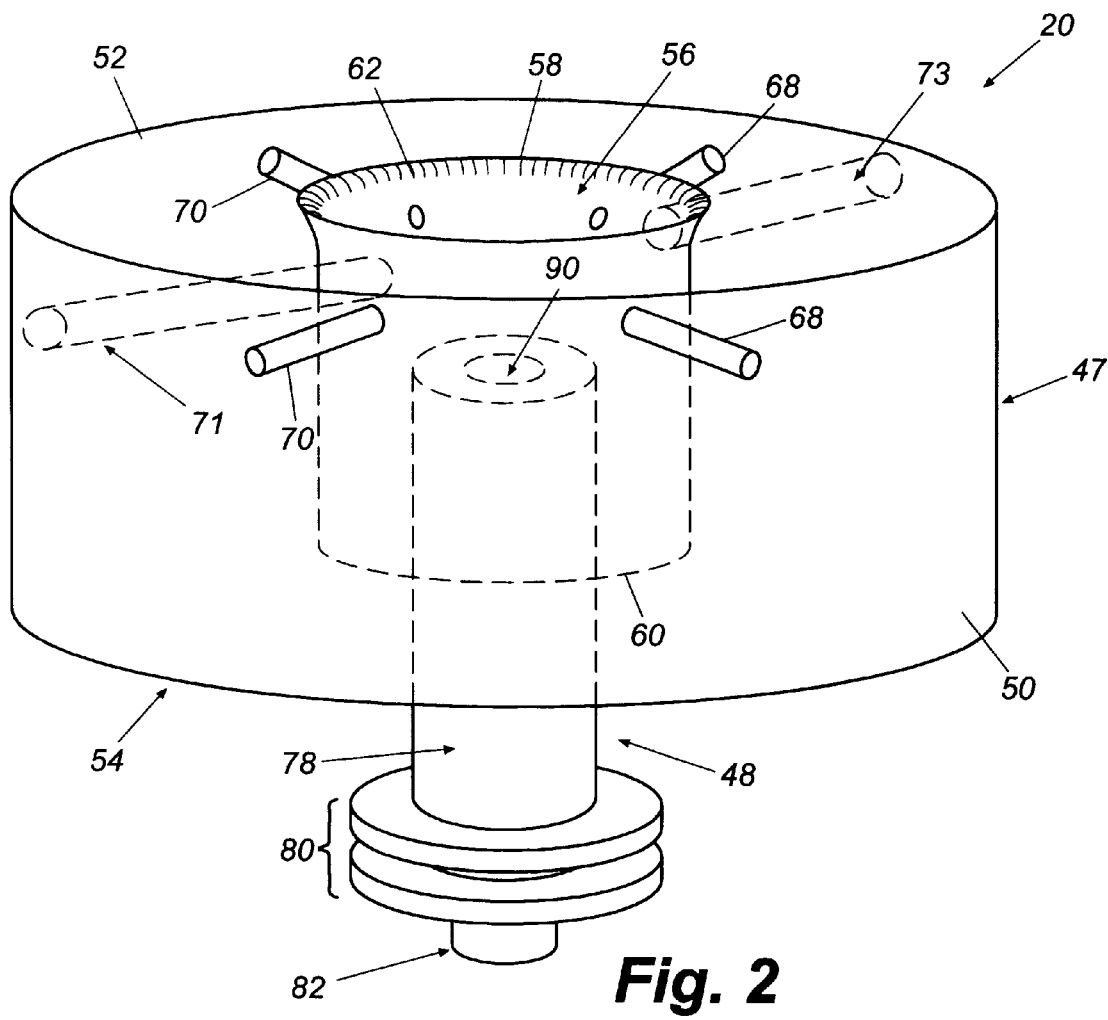
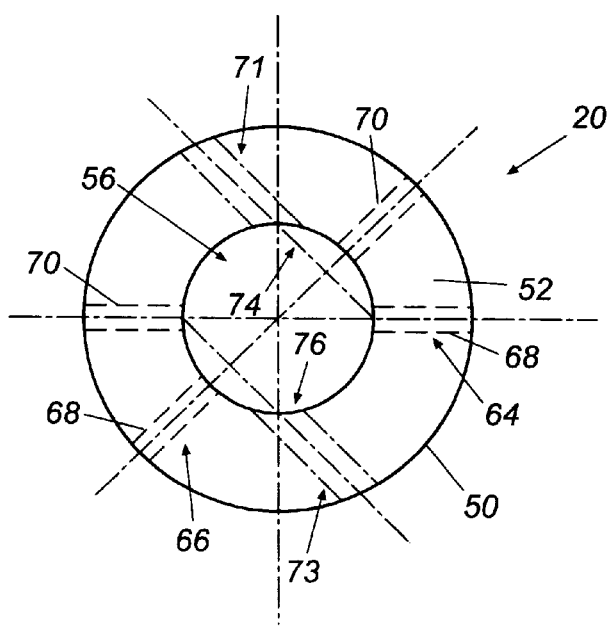

METHOD AND APPARATUS FOR REMOVING OPTICAL FIBER

FIELD OF THE INVENTION

The present disclosure relates to a method and apparatus for removing fiber. More particularly, the disclosure relates to a method and apparatus for gently removing a desired length of damaged optical fiber from an optical fiber spool.

BACKGROUND OF THE INVENTION

During optical fiber manufacturing and processing, the optical fibers are wound onto reels or spools which collect the fibers for further processing and/or storage. When such processing is conducted, the optical fiber normally is unwound from a first spool and rewound onto another spool after the processing has been completed. Between these spools, the optical fiber is processed in the desired manner. For instance, during fiber coloring (e.g., UV coloring), a spool of uncolored optical fiber is mounted to a pay off and the optical fiber is drawn through the coloring apparatus. After being colored, the optical fiber is brought to a take up spool which is used to collect the then colored fiber. The take up spool is driven by a motorized shaft which turns the spool to draw the fiber through the machine. Typically, a tensioning device, such as a biased dancer, is positioned between the coloring apparatus (or other processing apparatus) and the take up spool to ensure that the optical fiber is not over-tensioned during the winding process.

Despite the provision of a tensioning device such as a dancer, optical fibers can break during winding. When such a break occurs, the outer layer of the fiber collected on the take up spool should be discarded in that it is likely to be damaged and may cause either further fiber breaks and/or transmission losses when used. For example, approximately 1,200 to 1,500 meters normally are removed from a spool after a fiber break to ensure such problems do not occur.

Normally, a rewinding machine is used to remove the top layers of the fiber wound around the spool. In addition, such winding machines are used to eliminate sections of the fiber determined to be defective in some way. These machines are similar in nature to the winding machines, but operates in reverse such that the take up spool becomes the pay off spool, and another spool becomes the take up spool. Many of these rewinding machines are provided with tensioning devices similar to that described above. Furthermore, these machines normally include detectors which scan the fiber for defects. When a defect is detected, the machine quickly shuts down, normally in the span of one second, and the dancer drops, imposing a great deal of tension on the fiber. Further breaks often occur when rewinding machines are used. First, when a fiber break has already occurred, the tension applied by the machine can be too great for the damaged portions of fiber. In addition, when the machine detects a defect, the rough handling of the fiber can damage it. Accordingly, use of such machines often leads to further loss of fiber.

In addition to causing further fiber breaks, rewinding machines tend to be expensive. Due to their size, these machines also tend to monopolize large amounts of floor space. Furthermore, in that the spool comprising the damaged fiber to be discarded spins during rewinding, the operator is not able to inspect the fiber windings on the spool for damage while the fiber is being rewound. Therefore, rewinding must be periodically halted to allow the operator to inspect the fiber. This both wastes time and fiber in that this process is slow and often results in the disposal of more fiber than was originally intended.

From the foregoing, it can be appreciated that it would be desirable to have a method and apparatus for removing damaged optical fiber from fiber spools which is gentle, inexpensive, and which permits inspection of the fiber windings during the removal process.

SUMMARY OF THE INVENTION

The present disclosure relates to a system for removing optical fiber from a spool, comprising a frame adapted to support the spool of optical fiber, and a head adapted to be placed in axial alignment with the spool supported by the frame. The head has an internal passage that extends therethrough which is adapted to receive a portion of the optical fiber to be removed from the spool. The head further has a supply passage that extends through the head to the internal passage. This supply passage is oriented within the head to channel pressurized gas through the supply passage and through the internal passage so as to draw the optical fiber through the head to unravel the optical fiber from the spool. In a preferred embodiment, the head comprises at least one sensor capable of counting the number of revolutions the optical fiber makes within the internal passage such that the amount of fiber that passes through the head can be determined.

The present disclosure further relates to a method of removing optical fiber from a spool, comprising the steps of supporting the spooled optical fiber in a manner in which the longitudinal axis of the spool is substantially vertical, positioning a head below the spooled optical fiber in axial alignment therewith such that a portion of the spooled fiber can be drawn downwardly to the head, the head having an internal passage that extends from its top to its bottom and being adapted to receive the optical fiber, and supplying a pressurized gas flow to the internal passage of the head in a manner in which the gas flows downwardly therethrough so as to gently draw the optical fiber downwardly through the internal passage.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 2 is a perspective view of a head used in the system shown in FIG. 1.

FIG. 3 is a top view of a top portion of the head shown in FIG. 2, depicting the arrangements of sensors and air passages provided therein.

DETAILED DESCRIPTION

Figure 1:
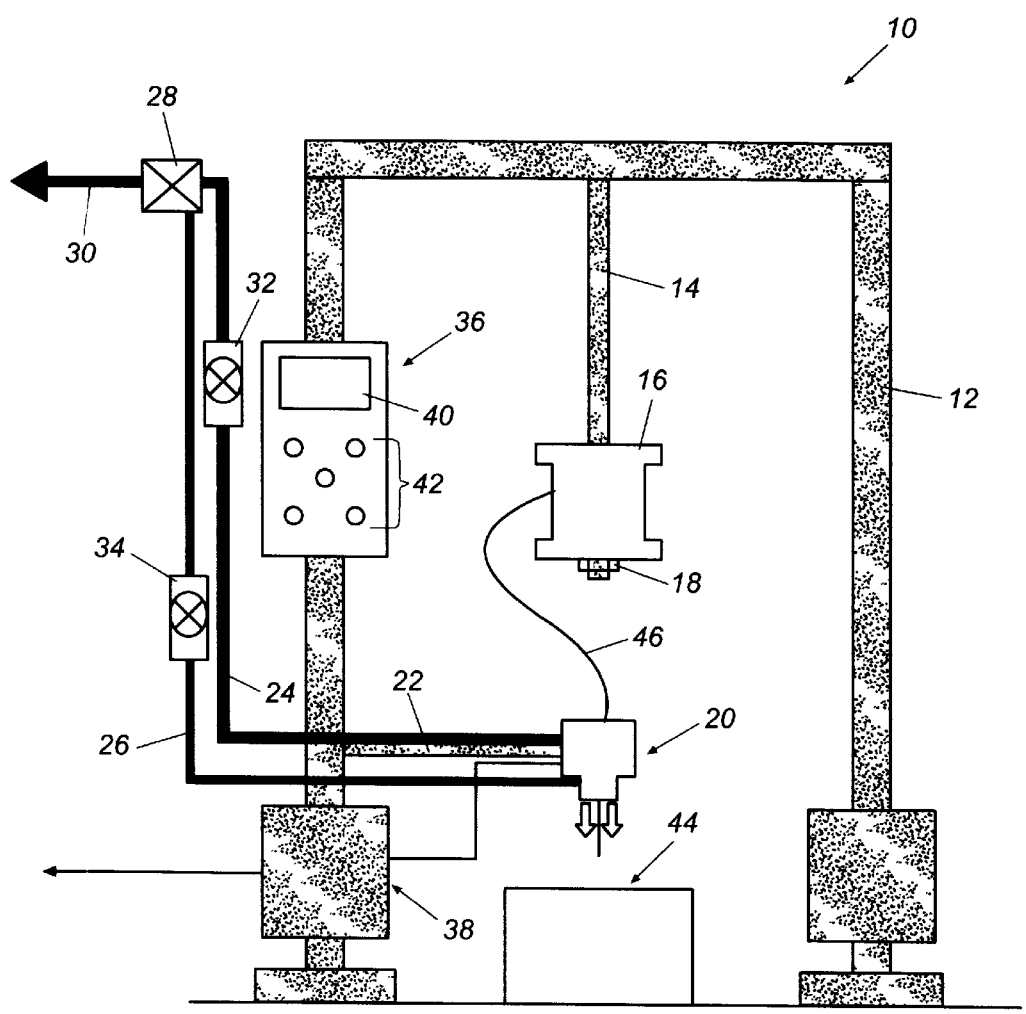
FIG. 1 is a schematic representation of a system for removing fiber constructed in accordance with the principles of the present invention.

Referring now in more detail to the drawings, in which like numerals indicate corresponding parts throughout the several views, FIG. 1 illustrates system 10 for removing optical fiber constructed in accordance with the principles of the present invention. As indicated in this figure, the system 10 generally comprises a frame 12 that includes a shaft 14 which extends downwardly from the top portion of the frame 12. The shaft 14 typically is cylindrical in shape and is sized such that a spool 16 of optical fiber can be slid onto the shaft 14 and supported in this position with a retainer 18. By way of example, the retainer 18 can comprise a quick release collar that grips the shaft 14 with enough force so as to support the spool 16 in a desired position along the length of the shaft 14.

Also included in the system 10 is a head 20 which, as shown in FIG. 1, typically also is supported by the frame 12. In particular, the head 20 can be mounted to a support arm 22 that extends inwardly from one of the sides of the frame 12 so as to vertically align the head 20 with the shaft 14. Normally positioned under the head 20 is a collection bin 44 which is used to collect the optical fiber 46 that is unwound from the spool 16 during the fiber removal process. As indicated in FIG. 1, the head 20 is connected in fluid communication to both a first gas supply line 24 and a second gas supply line 26. These supply lines 24, 26 similarly are in fluid communication with a main valve 28. Although capable of many different forms, the main valve 28 typically includes an internal solenoid valve (not shown) such that the main valve 28 can be electronically opened and shut. Also connected to the main valve 28 is a main gas supply line 30 which, as indicated in FIG. 1, leads to a pressurized gas source (not shown). Although the particular form of the gas source is not important, typically the source comprises a container of pressurized air.

Located along the lengths of the first and second supply lines 24 and 26, between the head 20 and the main valve 28, are first and second regulators 32 and 34. These regulators 32, 34 decrease the pressure of the gas passing therethrough to desired levels. Preferably, each of the regulators 32, 34 comprises an internal, normally-closed valve (not shown) with which flow to the head 20 can be interrupted. Normally, each of the shutoff valves comprises an electronic solenoid valve similar to that provided in the main valve 28.

Normally mounted to the frame 12 are both a control panel 36 and control box 38. As shown in FIG. 1, the control box 38 is electrically connected to the control panel 36 as well as each of the main valve 28, first and second regulators 32 and 34, and the head 20. The control box 38 comprises internal hardware and/or software that is used to control each of the aforementioned components. The system control box 38 is further connected to a computing device (not shown) as indicated in FIG. 1. The operation of the control box 38 is, in turn, controlled with the control panel 36. As indicated schematically in FIG. 1, the control panel 36 normally includes a counting device 40 which, as discussed in greater detail below, is used to enter and count the amount of fiber to be removed. In addition, the control panel 36 includes a plurality of control buttons 42 with which operation (e.g., start/stop) of the system 10 is controlled.

FIGS. 2–5 illustrate the head 20 in detail. As shown most clearly in FIG. 2, the head 20 generally comprises an upper portion 47 and a lower portion 48. The upper portion 47 comprises a cylindrical body 50 having a first end surface 52 and a second end surface 54. Extending through the head 20 from the first end surface 52 to the second end surface 54 is a first internal passage 56. In particular, the first internal passage 56 extends from a passage opening 58 provided in the first end surface 52 to a passage exit 60 provided in the second end surface 54. As most clearly shown in FIG. 2, the passage opening 58 includes an arcuate lip 62 which serves to lower friction and to prevent damage to the optical fiber 46 and to facilitate the fiber's removal from the spool 16. To ensure that friction is minimized, and to avoid fiber vibration typically the first internal passage 56 as well as the lip 62 are made of a hard, smooth material such as polished aluminum or a ceramic. To increase the hardness and strength of these two components, a coating such as plasma spray coatings or high velocity oxygen fuel coatings can be applied thereto.

As best shown in FIGS. 2 and 3, the head 20 is provided with a plurality of sensors and clearing passages. In the embodiment illustrated in these figures, the head 20 preferably comprises a first sensor 64 and a second sensor 66. By way of example, each sensor 64, 66 comprises a transmitter 68 which transmits light signals (e.g., laser beams) to a receiver 70 that is aligned therewith. For reasons discussed below, these sensors therefore can detect when an object, even a small object such as an optical fiber, passes through the beam. In addition, the head 20 typically includes a first dust/debris clearing passage 71 which, as shown in FIG. 3, is directed toward the first sensor's transmitter 68, and a second clearing passage 73 which is directed toward the first sensor's receiver 70. The first and second clearing passages 71 and 73 include first and second outlets 74 and 76, respectively, which open into the internal passage 56. As is illustrated in FIG. 2, each of these sensors and clearing passages are formed adjacent the passage opening 58 formed in the first end surface 52 of the head 20.

Figure 4:
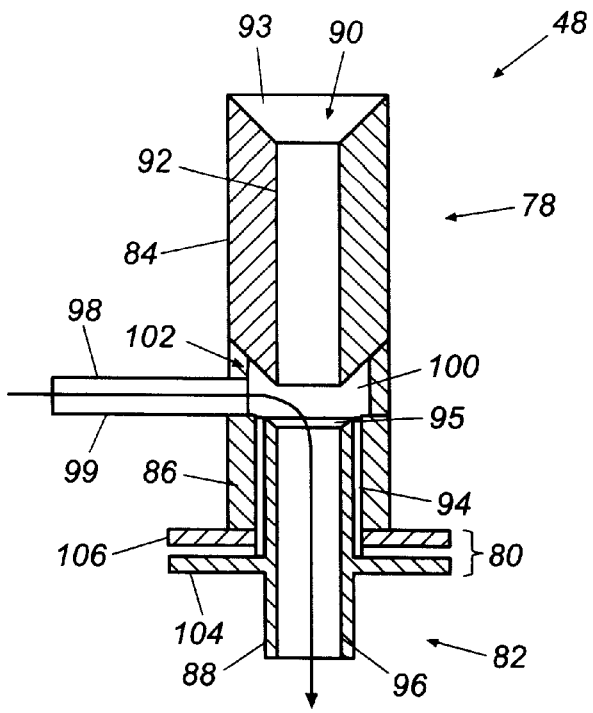
FIG. 4 is a cross-sectional view of a lower portion of the head, depicting a first orientation.
Figure 5:
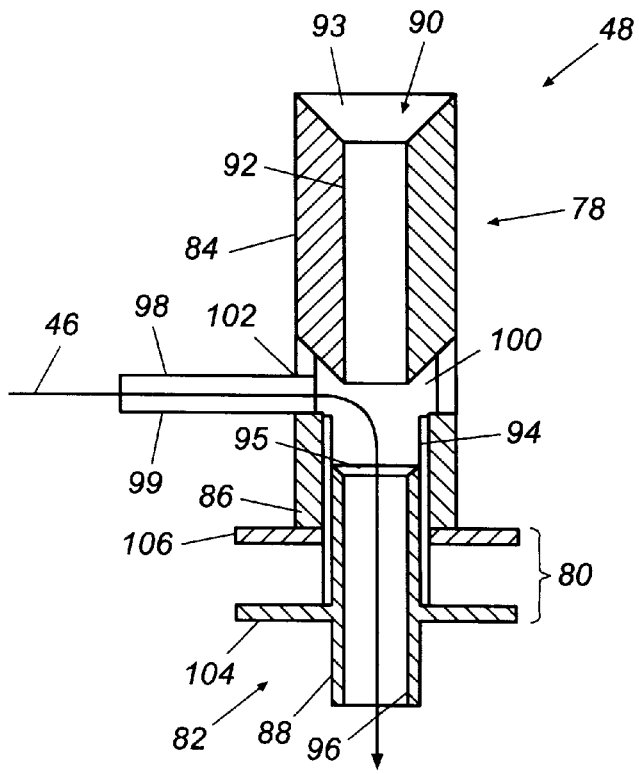
FIG. 5 is a cross-sectional view of the lower portion of the head, depicting a second orientation.

As is further indicated in FIG. 2, the lower portion 48 of the head 20 is configured so as to extend into the first internal passage 56 of the head 20. This lower portion 48 of the head 20 comprises a first tubular section 78, an intermediate adjustment section 80, and a second tubular section 82. As is illustrated in FIGS. 4 and 5, the lower portion 48 of the head 20 actually comprises a plurality of concentric tubes including a first tube 84, a second tube 86, and a third tube 88. Each of these tubes 84–88 align to form a second internal passage 90 through which the optical fiber 46 is drawn during the fiber removal process.

Normally, the entrance 93 of the first tube 84 is counter sunk so as to avoid causing friction with the optical fiber 46 as it passes through the first passage. Similarly, the entrance 95 of the third tube 88 is counter sunk for the same reason. The first tube 84 is provided with a first passage 92, the second tube 86 is provided with a second passage 94, and the third tube 88 is provided with a third passage 96. Connected to the lower portion 48 of the head 20 adjacent the juncture of the first and second tubes 84 and 86, is a supply tube 98 which provides a supply passage 99. As will be discussed in greater detail below, the supply tube 98 connects to the second supply line 26 (FIG. 1) so as to receive pressurized gas that is used to draw the optical fiber 46 off of its spool 16. As shown in FIGS. 4 and 5, the supply passage 99 of the supply tube 98 opens into an internal cavity 100. This cavity 100 is arranged adjacent the exit of the first passage 92, and the inlet of the third passage 96. As illustrated in the figures, the first tube 84 is provided with a tapered end 102 which, as is described hereinafter, serves to direct the pressurized gas flowing through the supply tube 98 down into the third passage 96 formed in the third tube 88.

Typically, the third tube 88 is threaded into the second tube 86 such that clock wise turning of the third tube 88 (when viewed from above) will cause the third tube 88 to extend outwardly from the second tube 86. To facilitate such adjustment, the third tube 88 normally includes a knurled peripheral flange 104. The second tube 86 normally also is provided with a peripheral flange 106 which is sized and shaped in similar manner as the peripheral flange 104 of the third tube 88 so as to prevent unintentional adjustment of the third tube 88. As indicated in FIG. 5, when the third tube 88 is rotated through several turns in the counter clockwise direction, the third tube 88 becomes positioned more distal from the first tube 84. When in such an orientation, the velocity of the flow of pressurized gas supplied by the supply tube 98 passing through the third passage 96 is reduced.

Operation

The apparatus of the inventive system having been generally described in the foregoing, the operation and usage of the system will now be discussed in detail. To remove optical fiber 46 from the spool 16, the optical fiber 46 is manually unwound from the spool 16 through one or two turns such that enough optical fiber 46 is provided to thread the optical fiber 46 through the head 20. In particular, the optical fiber 46 is threaded through the first and second internal passages 56 and 90 of the head 20. Due to the arcuate lip 62 formed on the passage opening 58, the optical fiber 46 creates little friction with the head 20 as it passes therethrough. The reduction of friction between the head 20 and the optical fiber 46 is important to ensure that the optical fiber 46 will easily slide through the head 20 without getting snagged.

To begin unwinding of the optical fiber 46 with the system 10, the operator initiates the system through the control panel 36. Once the system 10 is initiated, the normally-closed second regulator 34 is opened so that pressurized gas will flow from the main supply line 30, through the main valve 28, and through the second regulator 34 to be passed, via the second supply line 26, to the head 20. The second regulator 34 reduces the pressure of the gas to approximately 40 psi to 60 psi. This pressurized gas then flows through the supply tube 98 into the internal cavity 100 of the head 20. Due to the positioning of the supply tube 98 and to the tapered end 102 of the head first tube 84, this pressurized gas flows downwardly through the third passage 96 in the direction of the arrow shown in FIGS. 4 and 5. This flow creates a vacuum within the head 20 which draws the fiber 46 downwardly so that, under the additional force of its own weight, the fiber will quickly and gently pass through the head 20.

Figure 6:
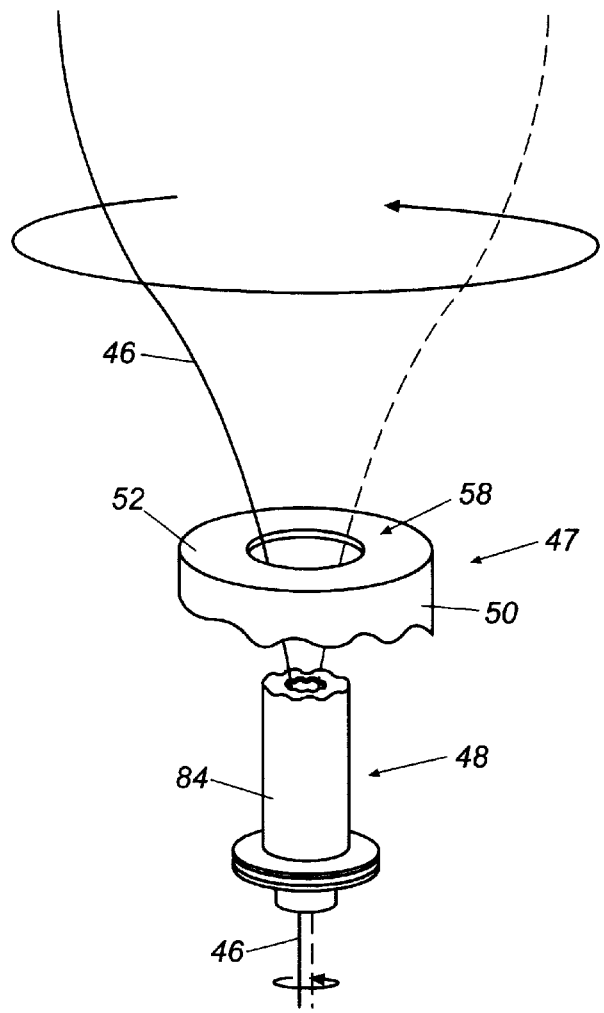
FIG. 6 is a schematic representation of an optical fiber passing through the head during the removal process.

The downward travel of the fiber 46 causes the fiber 46 to unravel from the spool 16. As the optical fiber 46 unravels from the spool 16, it leaves the spool 16 in a circular fashion as would a ribbon from a reel. Due to this circular motion of the optical fiber 46 as it is drawn downwardly, the optical fiber 46 traces a similar circular path along the passage opening 58 of the head 20. In particular, for each revolution the optical fiber 46 makes while unwinding from the spool 16, a similar single rotation is traveled along the inner circumference of the passage opening 54. In that the diameter of the spool 16 is larger than the diameter of the passage opening 54, the optical fiber 46 traces a generally cyclonic path as it unwinds from the spool to the head 20, as depicted in FIG. 6. Normally, this unwinding occurs at a rapid pace, for example, the optical fiber 46 making five to six full revolutions per second. Once the desired length of fiber has been removed, the operator can then simply cut the fiber and discard the removed portion.

In a typical situation, when an optical fiber breaks during processing, the operator can utilize the present system 10 to efficiently, quickly, and easily remove the damaged portion of the spooled optical fiber. Prior to unspooling the optical fiber 46, it is generally advisable to clear the dust and/or debris that may have formed on the sensors 64, 66 since the last time the system 10 has been used. In order to simplify this task and avoid misalignment of the sensors 64, 66, cleaning has been automated through the use of the pressurized gas. In particular, the operator can clear the sensors 64, 66 by directing this pressurized gas through the first supply line 24 to the first and second clearing passages 71 and 73. As indicated in FIG. 3, these clearing passages 70, 72 are configured so as to direct the pressurized gas directly upon the transmitter 68 and receiver 70 of the first sensor 64. Due to the close proximity between the first and second sensors 64 and 66, the second sensor 66 is also cleared with this pressurized gas. To ensure that the sensors 66, 68 are adequately cleared, normally gas at a pressure of approximately 40 psi to 60 psi is ejected from the first and second clearing passages 70 and 72 for a period of approximately 4 seconds.

Once the sensors 66, 68 have been adequately cleared, the system 10 is prepared to remove optical fiber 46 from the spool 16 in the manner disclosed above. In a first embodiment, the operator can enter a revolution number which correlates to a particular length of optical fiber 46 into the counting device 40. This revolution number pertains to the number of revolutions the optical fiber 46 makes within the head 20. As each revolution of the optical fiber 46 is made, the first sensor 64 counts interruptions of the beam shown from its transmitter 68 to its associated receiver 70. Hence, for each full revolution of the optical fiber 46 within the internal passage 52, the first sensor 64 records two counts. By determining the length of optical fiber 46 that passes through the head 20 with each full revolution within the head 20, a correlation between the number of revolutions and length of optical fiber 46 that has passed through the head 20 can be developed. Once this correlation is known, the desired length of optical fiber can be removed by simply entering the required number of counts into the counting device 40 provided on the control panel 36. For instance, under the system parameters described above, the optical fiber 46 undergoes approximately 1,500 full revolutions per approximately 1,200 meters of fiber, and therefore 3,000 counts must be made by the optical fiber 46 in the head before approximately 1,200 meters of optical fiber are unwound from the spool 16. In that it is possible for the optical fiber to become caught during the removal process (e.g., due to overlapping windings) in a position in which the first sensor 66 counts revolutions but no actual revolutions are made (e.g., vibrating at the edge of the beam), the second sensor 68 can be used as a back up device. For example, if the first sensor 66 counts revolutions but the second sensor does not, an alarm can sound and the system can automatically be shut down. Similarly, if neither sensor senses revolutions, the system can shut down automatically in like manner. The length of optical fiber 46 removed from the spool 16 can, of course, be monitored in other ways. For instance, a load cell (not shown) can be disposed within the collection bin 44 so that the weight of the removed fiber can be measured. When the weight per unit length of this fiber 46 is known, the length of the fiber 46 therefore can easily be calculated with the weight measurement made by the load cell.

Figure 7:
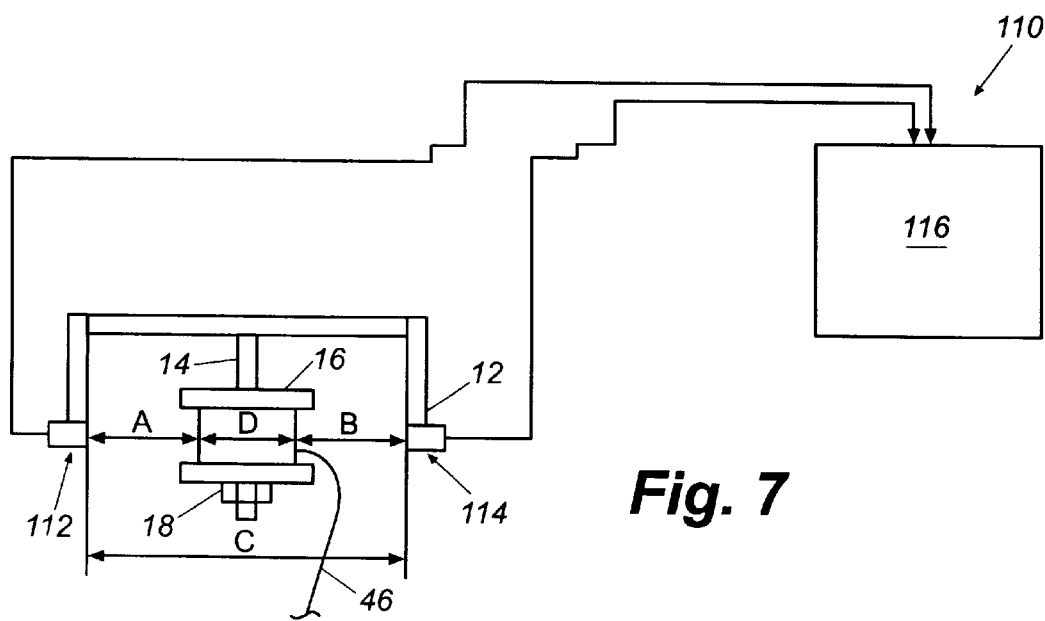
FIG. 7 is a schematic representation of a length counting system which can be used to determine the amount of fiber that has been removed.

In another embodiment, the length of the fiber wished to be removed can be entered directly with the control panel 36. In this case, the system 10 automatically calculates the amount of fiber removed from the spool from the length per revolution rate. As can be readily appreciated, however, the amount of the optical fiber 46 removed from the spool 16 passing through the head 24 for each full revolution will vary depending upon the diameter of the spooled fiber. That is to say, a large diameter of spooled fiber will yield a greater length of fiber for each revolution as compared to a small diameter of spooled fiber. To account for the size of the spool of optical fiber and to further automate the removal system, the invention can comprise an alternative length counting system 110 illustrated in FIG. 7. As shown in this figure, the diameter of the spooled optical fiber is represented by the letter D. To determine the actual value of this length D, first and second sensors 112 and 114 can be positioned on both sides of the spool 16. When the separation distance, C, between the two sensors 112, 114 is known, this diameter, D, can be determined. In particular, the sensors 112, 114 can be used to determine the distances A and B, respectively, to the spool 16 of optical fiber 46. Once these distances are determined, the diameter can be calculated with a computing device 116 with the following formula:

$$D = C - (A+B) \quad \text{[Equation 1]}$$

Once this diameter, D, is known, the number of revolutions necessary to obtain the desired length of fiber can be computed. For instance, in an example embodiment of the invention, this number of revolutions, N, can be computed as follows:

$$N = (L \times (1,000/D\pi)) \quad \text{[Equation 2]}$$

With this information, the system 10 can receive a directly inputted length, e.g., 1,000 meters, and can automatically compute the number of revolutions that should be counted by the first sensor 64. In our example, 1,000 meters translates into 1,247 full revolutions. Therefore, if the operator were to input 1,000 meters into the control panel 36, the system would operate to pull the optical fiber 46 through 1,247 full revolutions within the internal passage 58 of the head 20 to remove 1,000 meters of fiber.

While particular embodiments of the invention have been disclosed in detail in the foregoing description and drawings for purposes of example, it will be understood by those skilled in the art that variations and modifications thereof can be made without departing from the spirit and scope of the invention as set forth in the following claims.

What is claimed is:

1. A system for removing optical fiber from a spool, comprising:
   a frame adapted to support the spool of optical fiber; and
   a head adapted to be placed in axial alignment with the spool supported by said frame, said head having an internal passage that extends therethrough, said internal passage being adapted to receive a portion of the optical fiber to be removed from the spool, said head further having a supply passage that extends through said head to said internal passage, said supply passage being oriented within said head to channel pressurized gas through said supply passage and through said internal passage so as to draw the optical fiber through said internal passage to unravel the optical fiber from the spool, said head further having at least one sensor therein.

2. The system of claim 1, wherein said at least one sensor is capable of counting the number of revolutions the optical fiber makes within said internal passage.

3. The system of claim 2, wherein said at least one sensor transmits and receives a beam of light across said internal passage.

4. The system of claim 2, further comprising a control system electronically connected to said at least one sensor so as to receive sensed signals therefrom.

5. The system of claim 2, further comprising at least one clearing passage formed within said head, said at least one clearing passage being oriented within said head so as to be capable of directing pressurized gas at said at least one sensor to clear dust and/or debris from said at least one sensor.

6. The system of claim 1, further comprising a source of pressurized gas and a supply line, said supply line fluidly connecting said source of pressurized gas to said supply passage of said head.

7. The system of claim 6, further comprising at least one valve disposed along said supply line which can be opened and closed to, respectively, supply and shut off the flow of gas to said head.

8. The system of claim 1, wherein said head comprises an upper and a lower portion, said upper portion having a first internal passage and said lower portion having a second internal passage in axial alignment with said first internal passage.

9. The system of claim 8, wherein said supply passage is formed within said lower portion of said head.

10. The system of claim 1, wherein said head includes a first peripheral flange and a second peripheral flange that can be adjusted so as to permit adjustment of the velocity of the flow of gas therethrough.

11. A system for removing optical fiber from a spool, comprising:
   a frame adapted to support the spool of optical fiber in an orientation in which the longitudinal axis of the spool is substantially vertical; and
   a head positioned underneath the spool supported by said frame in axial alignment therewith, said head having an internal passage that extends from an opening formed in a top surface thereof to an opening formed in a bottom surface thereof, said internal passage being adapted to receive a portion of the optical fiber to be removed from the spool supported above said head, said head further having a supply passage that extends through said head to said internal passage, said supply passage being oriented within said head to channel pressurized gas through said supply passage and through said internal passage so as to draw the optical fiber through said internal passage to unravel the optical fiber under the additional force of its own weight from the spool, said head further having at least one sensor therein.

12. The system of claim 11, wherein said at least one sensor is capable of counting the number of revolutions the optical fiber makes within said internal passage.

13. The system of claim 12, wherein said at least one sensor transmits and receives a beam of light across said internal passage.

14. The system of claim 12, further comprising a control system electronically connected to said at least one sensor so as to receive sensed signals therefrom.

15. The system of claim 12, further comprising at least one clearing passage formed within said head, said at least one clearing passage being oriented within said head so as to be capable of directing pressurized gas at said at least one sensor to clear dust and/or debris from said at least one sensor.

16. The system of claim 11, further comprising a source of pressurized gas and a supply line, said supply line fluidly connecting said source of pressurized gas to said supply passage of said head.

17. The system of claim 16, further comprising at least one valve disposed along said supply line which can be opened and closed to, respectively, supply and shut off the flow of gas to said head.

18. The system of claim 11, wherein said head comprises an upper and a lower portion, said upper portion having a first internal passage and said lower portion having a second internal passage in axial alignment with said first internal passage.

19. The system of claim 18, wherein said supply passage is formed within said lower portion of said head.

20. The system of claim 11, wherein said head includes a first peripheral flange and a second peripheral flange that can be adjusted so as to permit adjustment of the velocity of the flow of gas therethrough.

21. A method of removing optical fiber from a spool, comprising the steps of:

supporting the spooled optical fiber in a manner in which the longitudinal axis of the spool is substantially vertical;

positioning a head below the spooled optical fiber in axial alignment therewith such that a portion of the spooled fiber can be drawn downwardly to the head, the head having an internal passage that extends from its top to its bottom and being adapted to receive the optical fiber and said head further having at least one sensor therein; and supplying a pressurized gas flow to the internal passage of the head in a manner in which the gas flows downwardly therethrough so as to gently draw the optical fiber downwardly through the internal passage.

22. The method of claim 21, further comprising the step of counting the number of revolutions the optical fiber passes through within the internal passage as a measure of the length of optical fiber that has been removed from the spool.

23. The method of claim 22, wherein the counting step is performed by said at least one sensor disposed in the head.

24. The method of claim 22, further comprising the step of determining the length of fiber passing through the internal passage from the diameter of the spooled fiber.

25. The method of claim 21, further comprising the set monitoring the optical fiber windings on the spool while the fiber is being removed.

* * * * *